United States Patent
Lee et al.

(10) Patent No.: US 11,163,407 B2
(45) Date of Patent: Nov. 2, 2021

(54) INPUT DEVICE INCLUDING PEN TIP, ELECTRONIC SYSTEM AND CONTROL METHOD THEREFOR

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Hyung-sun Lee, Yongin-si (KR); Kang-yoon Lee, Seoul (KR); Sung-hun Cho, Suwon-si (KR); Gwan-hyung Kim, Suwon-si (KR); Sang-yun Kim, Suwon-si (KR); Ho-chul Ryu, Suwon-si (KR); Sang-ho Kim, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 108 days.

(21) Appl. No.: 16/493,910

(22) PCT Filed: Feb. 7, 2018

(86) PCT No.: PCT/KR2018/001624
§ 371 (c)(1),
(2) Date: Sep. 13, 2019

(87) PCT Pub. No.: WO2018/169208
PCT Pub. Date: Sep. 20, 2018

(65) Prior Publication Data
US 2021/0124472 A1    Apr. 29, 2021

(30) Foreign Application Priority Data
Mar. 16, 2017 (KR) .................. 10-2017-0032967

(51) Int. Cl.
*G06F 3/044* (2006.01)
*G06F 3/041* (2006.01)

(52) U.S. Cl.
CPC ........ *G06F 3/0442* (2019.05); *G06F 3/04162* (2019.05)

(58) Field of Classification Search
CPC .. G06F 3/04162; G06F 3/0416; G06F 3/0441; G06F 3/0442; G06F 2203/04106; G06F 2203/04114; G06F 2203/041
See application file for complete search history.

(56) References Cited

U.S. PATENT DOCUMENTS

| 5,629,500 A | 5/1997 | Fukuzaki et al. |
| 8,638,320 B2 | 1/2014 | Harley et al. |

(Continued)

FOREIGN PATENT DOCUMENTS

| JP | 7-225644 | 8/1995 |
| JP | 3540048 | 7/2004 |

(Continued)

OTHER PUBLICATIONS

International Search Report for PCT/KR2018/001624 dated May 9, 2018, 6 pages with English Translation.

(Continued)

*Primary Examiner* — Lisa S Landis
(74) *Attorney, Agent, or Firm* — Nixon & Vanderhye, P.C.

(57) ABSTRACT

An input device is provided. The input device includes a communicator for communicating with an electronic device, a pen tip provided on one end portion of the input device, an electrode part provided at a position spaced apart at a predetermined interval from the pen tip, and a processor configured to apply a predetermined frequency signal to the electrode part, and control the communicator so as to (Continued)

transmit, to the electronic device, the signal of which frequency changed according to a capacitance formed between the electrode part and the electronic device.

12 Claims, 14 Drawing Sheets

(56) References Cited

U.S. PATENT DOCUMENTS

| | | | |
|---|---|---|---|
| 8,963,889 B2 | 2/2015 | Oda et al. | |
| 9,529,456 B2 | 12/2016 | Oda et al. | |
| 9,569,041 B2 | 2/2017 | Son | |
| 9,606,640 B2 | 3/2017 | Oda et al. | |
| 9,632,599 B2 | 4/2017 | Oda et al. | |
| 2012/0327042 A1* | 12/2012 | Harley | G06F 3/03545 345/179 |
| 2014/0028634 A1 | 1/2014 | Krah et al. | |
| 2016/0188016 A1 | 6/2016 | Munakata et al. | |
| 2016/0224174 A1 | 8/2016 | Hashimoto | |
| 2018/0011557 A1 | 1/2018 | Katsurahira et al. | |

FOREIGN PATENT DOCUMENTS

| | | |
|---|---|---|
| JP | 5944362 | 7/2016 |
| KR | 10-2011-0091459 | 8/2011 |
| KR | 10-2014-0035726 | 3/2014 |
| KR | 10-2016-0016065 | 2/2016 |
| KR | 10-1631996 | 6/2016 |
| WO | 2016/158418 | 10/2016 |

OTHER PUBLICATIONS

Written Opinion of the ISA for PCT/KR2018/001624 dated May 9, 2018, 18 pages with English Translation.
Office Action dated Feb. 18, 2021 in counterpart Korean Patent Application No. 10-2017-0032967 and English-language translation.

* cited by examiner

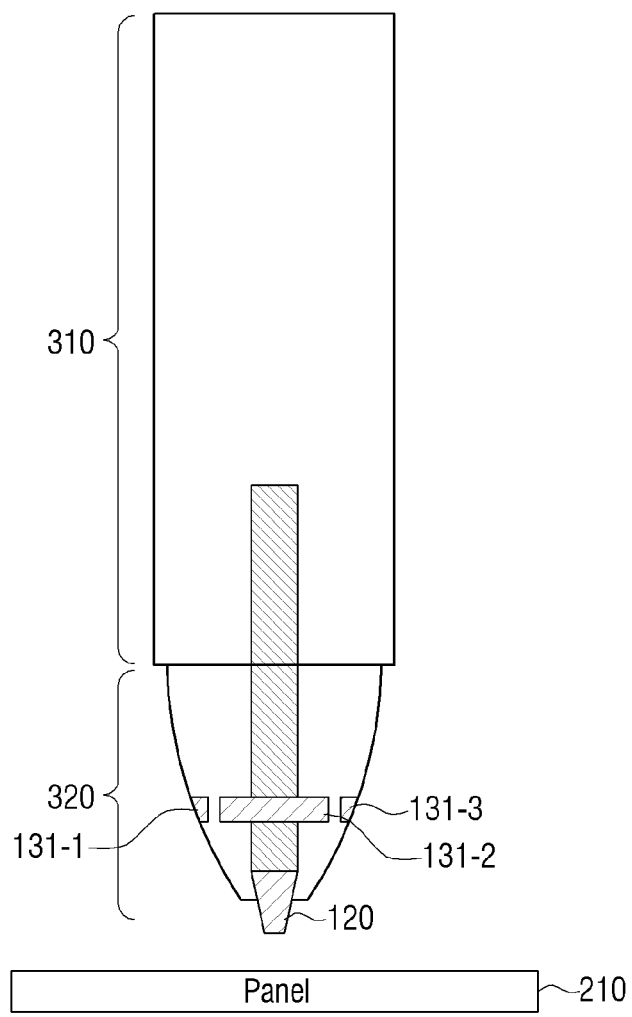

INPUT DEVICE INCLUDING PEN TIP, ELECTRONIC SYSTEM AND CONTROL METHOD THEREFOR

This application is the U.S. national phase of International Application No. PCT/KR2018/001624 filed Feb. 7, 2018 which designated the U.S. and claims priority to Korean Patent Application No. 10-2017-0032967 filed Mar. 16, 2017, the entire contents of each of which are hereby incorporated by reference.

TECHNICAL FIELD

The disclosure relates to an input device and a control method therefor, and more particularly, to an input device of a pen type, an electronic system, and a control method therefor.

BACKGROUND ART

Spurred by development of electronic technologies, various types of electronic devices are being developed and distributed.

In particular, recently, distribution of smartphones or tablet PCs that users can carry is proceeding actively. Most smartphones or tablet PCs include touch screens, and users can control functions of electronic devices by using touch screens.

A user may touch a touch screen by using not only his or her body part (e.g., a finger, etc.) but also an input device in the form of a pen. An electronic device may perform different control operations according to the touch coordinate of a point wherein a body part or an input device, etc. touched a touch screen and a menu (or an icon) displayed on the touch coordinate.

In particular, an electronic device may perform various functions such as adjusting thickness of handwriting trajectory based on the tilting degree of an input device. Accordingly, a method for an input device to effectively transmit its tilting information to an electronic device is required.

SUMMARY

The disclosure was devised for addressing the aforementioned problem, and the purpose of the disclosure is in providing an input device that detects a tilt by using a signal of which frequency changes according to a capacitance formed between the input device and an electronic device, an electronic system, and a control method therefor.

An input device according to an embodiment of the disclosure for achieving the aforementioned purpose includes a communicator for communicating with an electronic device, a pen tip provided on one end portion of the input device, an electrode part provided at a position spaced apart at a predetermined interval from the pen tip, and a processor configured to apply a predetermined frequency signal to the electrode part, and control the communicator so as to transmit, to the electronic device, the signal of which frequency changed according to a capacitance formed between the electrode part and the electronic device. In this case, the capacitance changes according to the tilting degree of the input device.

Also, the processor includes an RC oscillator, and the capacitance formed between the electrode part and the electronic device operates as a capacitance of the RC oscillator.

In addition, the electrode part includes a first sub electrode and a second sub electrode that are spaced apart from each other. Meanwhile, the processor may apply a first frequency signal to the first sub electrode and apply a second frequency signal to the second sub electrode, and transmit, to the electronic device, the first frequency signal of which frequency changed according to a first capacitance formed between the first sub electrode and the electronic device and the second frequency signal of which frequency changed according to a second capacitance formed between the second sub electrode and the electronic device.

Also, the first frequency signal and the second frequency signal may be signals that change within different frequency ranges from each other according to the degree that the input device rotated based on a predetermined position.

Here, the input device may be implemented as a stylus pen of an active type.

Meanwhile, an electronic system comprising an input device and an electronic device communicating with the input device according to an embodiment of the disclosure includes an input device that includes a pen tip provided on one end portion of the input device, an electrode part provided at a position spaced apart at a predetermined interval from the pen tip, and an oscillator configured to apply a predetermined frequency signal to the electrode part, and output the signal of which frequency changed according to a capacitance formed between the electrode part and the electronic device, and transmits the output signal of the oscillator to the electronic device, and an electronic device that determines a tilt of the input device based on the frequency of the output signal received from the input device, and performs an operation corresponding to the determined tilt.

Here, the oscillator is implemented as an RC oscillator, and the capacitance formed between the electrode part and the electronic device may operate as a capacitance of the RC oscillator.

Also, the electronic device may determine a tilt of the input device by comparing a reference frequency and the frequency of the output signal received from the input device.

In this case, the reference frequency may be the frequency of the output signal of the oscillator in a state wherein the input device is at a predetermined angle with respect to the electronic device.

In addition, the electrode part may include a first sub electrode and a second sub electrode that are spaced apart from each other. Meanwhile, the oscillator may apply a first frequency signal to the first sub electrode and apply a second frequency signal to the second sub electrode, output the first frequency signal of which frequency changed according to a first capacitance formed between the first sub electrode and the electronic device, and output the second frequency signal of which frequency changed according to a second capacitance formed between the second sub electrode and the electronic device.

Also, the electronic device may, based on receiving the first and second frequency signals from the input device, determine the degree that the input device rotated based on a predetermined position based on the frequencies of the first and second frequency signals.

Meanwhile, a control method of an input device according to an embodiment of the disclosure may include the steps of applying a predetermined frequency signal to an electrode part spaced apart at a specific interval from a pen tip provided on one end portion of the input device, and transmitting, to the electronic device, the signal of which frequency changed according to a capacitance formed between the electrode part and the electronic device.

Also, the input device includes an RC oscillator, and the capacitance formed between the electrode part and the electronic device may operate as a capacitance of the RC oscillator.

In addition, the electrode part includes a first sub electrode and a second sub electrode that are spaced apart from each other. Meanwhile, the oscillator may apply a first frequency signal to the first sub electrode and apply a second frequency signal to the second sub electrode, and output the first frequency signal of which frequency changed according to a first capacitance formed between the first sub electrode and the electronic device, and output the second frequency signal of which frequency changed according to a second capacitance formed between the second sub electrode and the electronic device. In this case, in the step of transmitting to the electronic device, the first and second frequency signals of which frequencies changed may be transmitted to the electronic device.

Here, the input device may be implemented as a stylus pen of an active type.

According to the various embodiments of the disclosure as described above, a frequency signal is transmitted while tilt information of an input device is included therein. Accordingly, the amount of power consumption of the input device can be reduced. Also, by a method of reflecting a capacitance in output of an oscillator and detecting the capacitance, the configuration of the input device can be made simple, and the area of chip design can be minimum.

BRIEF DESCRIPTION OF THE DRAWINGS

FIG. 5A is a diagram for illustrating a configuration of an input device according to another embodiment of the disclosure;

DETAILED DESCRIPTION OF EXAMPLE EMBODIMENTS

Figure 1A:
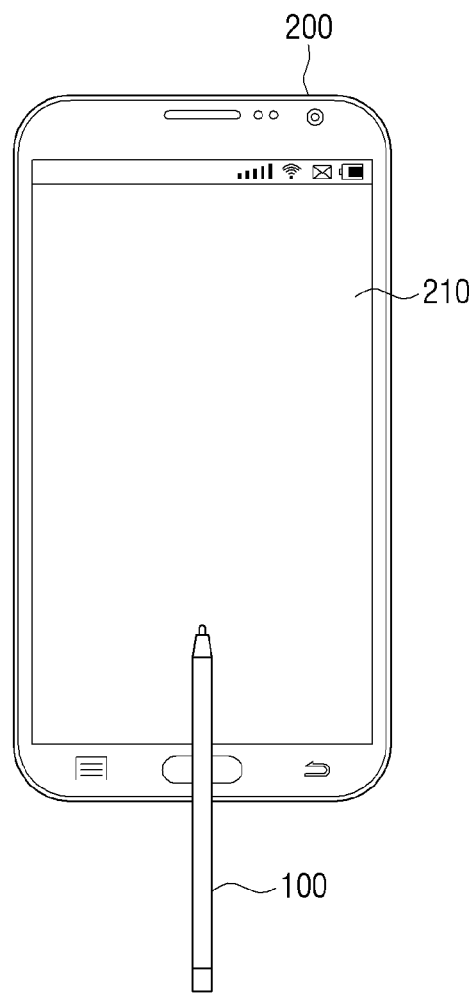
FIG. 1A is a diagram for illustrating schematic operations of an input device and an electronic device according to an embodiment of the disclosure.

Hereinafter, the disclosure will be described in detail with reference to the accompanying drawings.

First, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions or emergence of new technologies. Also, in particular cases, there may be terms that were designated by the applicant on his own, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

Also, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing embodiments, detailed explanation of related known technologies may unnecessarily confuse the gist of the disclosure, the detailed explanation will be omitted.

Terms such as the first, the second, and the like may be used to describe various elements, but the elements are not limited by the terms. Such terms are used only to distinguish one element from another element.

Also, singular expressions include plural expressions, unless defined obviously differently in the context. Further, in the disclosure, terms such as "include" or "consist of" should be construed as designating that there are such characteristics, numbers, steps, operations, elements, components or a combination thereof described in the specification, but not as excluding in advance the existence or possibility of adding one or more of other characteristics, numbers, steps, operations, elements, components or a combination thereof.

Meanwhile, in the disclosure, "a module" or "a part" may perform at least one function or operation, and may be implemented as hardware or software, or as a combination of hardware and software. Further, a plurality of "modules" or "parts" may be integrated into at least one module and implemented as at least one processor (not shown), excluding "a module" or "a part" that needs to be implemented as specific hardware.

Hereinafter, the embodiments of the disclosure will be described in detail with reference to the accompanying drawings, such that those having ordinary skill in the art to which the disclosure belongs can easily carry out the embodiments. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

Figure 1B:
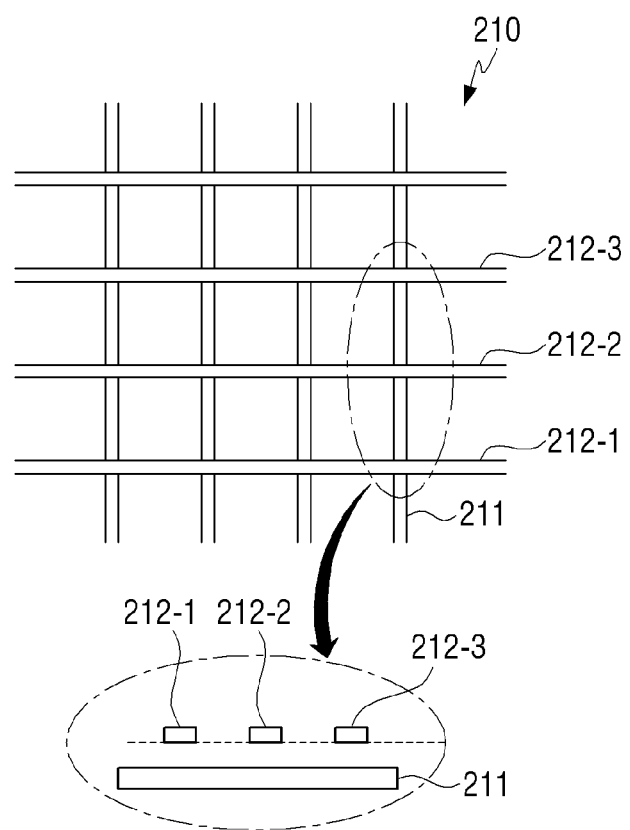
FIG. 1B is a diagram for illustrating schematic operations of an input device and an electronic device according to an embodiment of the disclosure.

FIGS. 1A and 1B are diagrams for illustrating schematic operations of an input device and an electronic device according to an embodiment of the disclosure.

Referring to FIG. 1A, the input device 100 according to an embodiment of the disclosure may have a uniform length, and may be implemented in the form of a thin and long pen such that a user can hold it easily. Accordingly, the input device 100 may be referred to as various terms such as an electronic pen, a pen-type input device, a stylus pen, and an S-pen, but it does not necessarily have to be implemented in the form of a pen. For example, the input device 100 may be implemented to have a body in a blunt or flat shape.

Also, the input device 100 may be implemented in an active type. An active type is a type wherein a battery is housed inside the input device 100 and generates a unique signal, and a sensor for detecting the input device 100 is added to an electronic device 200, and the input device 100 is recognized on the side of the operating system of the electronic device 200. In this case, as the input device 100 and a finger touch are distinguished, and each input device is recognized while being distinguished, various operations that come and go between a finger and a pen become possible.

The electronic device 200 may be implemented as an input panel like a touch panel or a touch screen, or as an electronic device like a notebook computer including a touch panel or a touch screen, a lap-top, a mobile phone, a smartphone, an electronic board, digital signage, a PMP, an MP3 player, a game machine, a kiosk, and a monitor.

A capacitive touch panel according to an embodiment of the disclosure may have an electrode pattern structure as in FIG. 1B. The grid-patterned electrode pattern illustrated in FIG. 1B includes a line in a vertical direction 211 and lines in a horizontal direction 212-1, 212-2, 212-3. A capacitive touch panel of the above type may be divided into a transmitter that transmits an electric field and a receiver that detects a change in the electric field, and may detect a coordinate by detecting a change in the electric field due to contact of a conductor. Specifically, if an electric field is output from the input device 100 itself, the electrode pattern detects a change in the electric field. If contact of a finger is going to be detected, a method of making an electrode in a first direction divided to a transmitter and an electrode in a second direction divided to a receiver, between intersecting electrodes in two directions, and making the electrodes function may be used.

Meanwhile, the electronic device 200 may perform different control operations according to signals output from the input device 100. For example, in case a user touched the input device 100 on the touch screen of the electronic device 200 and are moving the touch point, the electronic device 200 displays a line, i.e., handwriting trajectory along the movement trajectory. In such a state, the user may adjust the thickness, brightness, size, color, chroma, font, shape, etc. of the handwriting trajectory through manipulation. For example, the electronic device 200 may adjust the thickness of the handwriting trajectory based on the tilt of the input device 100.

In this case, the electronic device 200 needs to acquire tilt information of the input device 100. According to an embodiment of the disclosure, the input device 100 may transmit a signal of which frequency changed according to a tilt to the electronic device 200.

Figure 2:
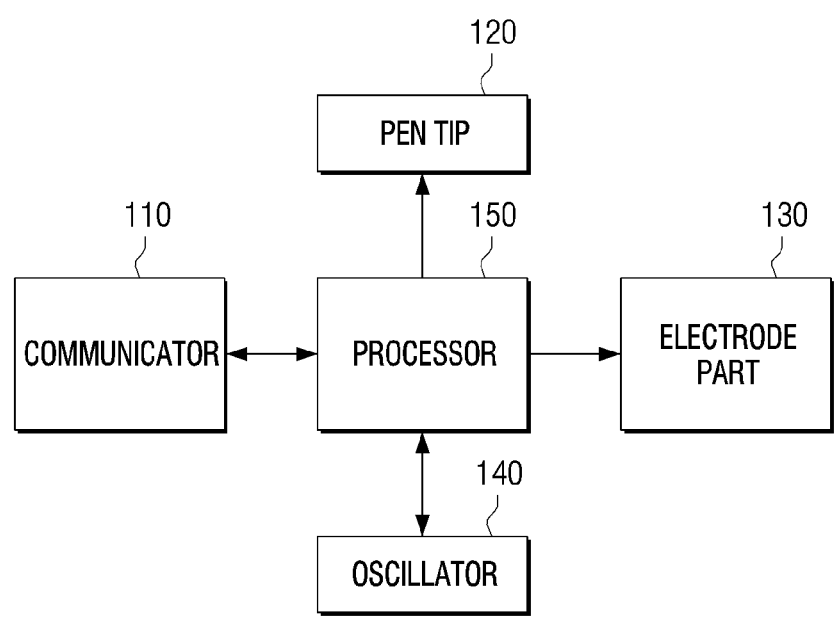
FIG. 2 is a block diagram illustrating components of an input device according to an embodiment of the disclosure.

FIG. 2 is a block diagram illustrating components of an input device according to an embodiment of the disclosure.

According to FIG. 2, the input device 100 includes a communicator 110, a pen tip 120, an electrode part 130, a driver 140, and a processor 150.

The communicator 110 performs communication with the electronic device 200. The communicator 110 may include at least one of a near field communication module, a wireless LAN communication module, or a wired Ethernet module, according to the performance and configuration of the input device 100. For example, the communicator 110 may be implemented as a communication module such as an infrared communication module and a Bluetooth communication module. As an example, a communication module may be provided on the pen tip 120.

The pen tip 120 may be formed on one end portion of the input device 100.

Figure 3A:
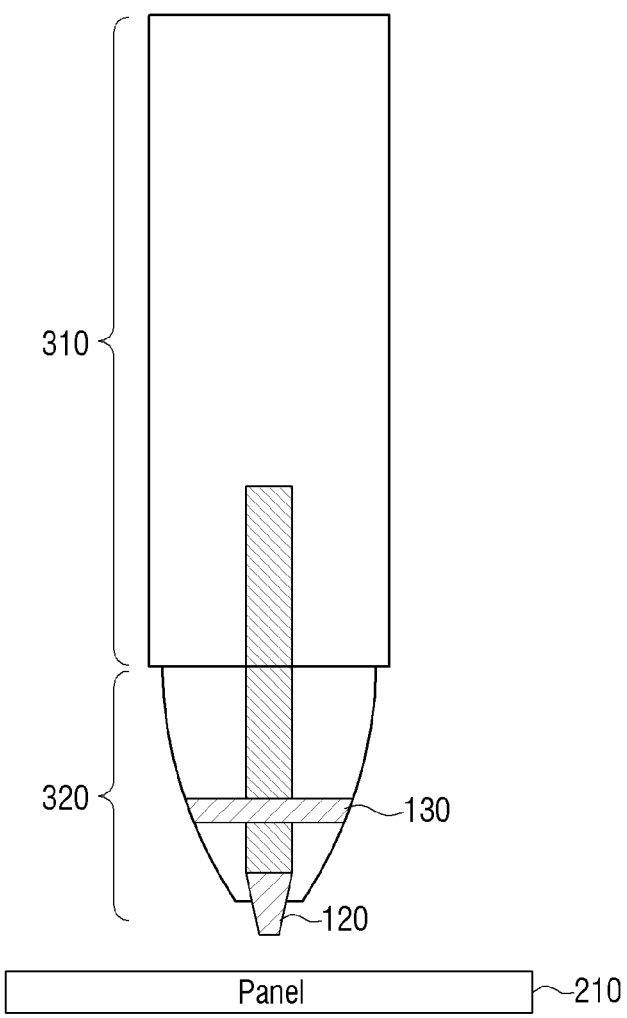
FIG. 3A is a diagram for illustrating a configuration of an input device according to an embodiment of the disclosure.
Figure 3B:
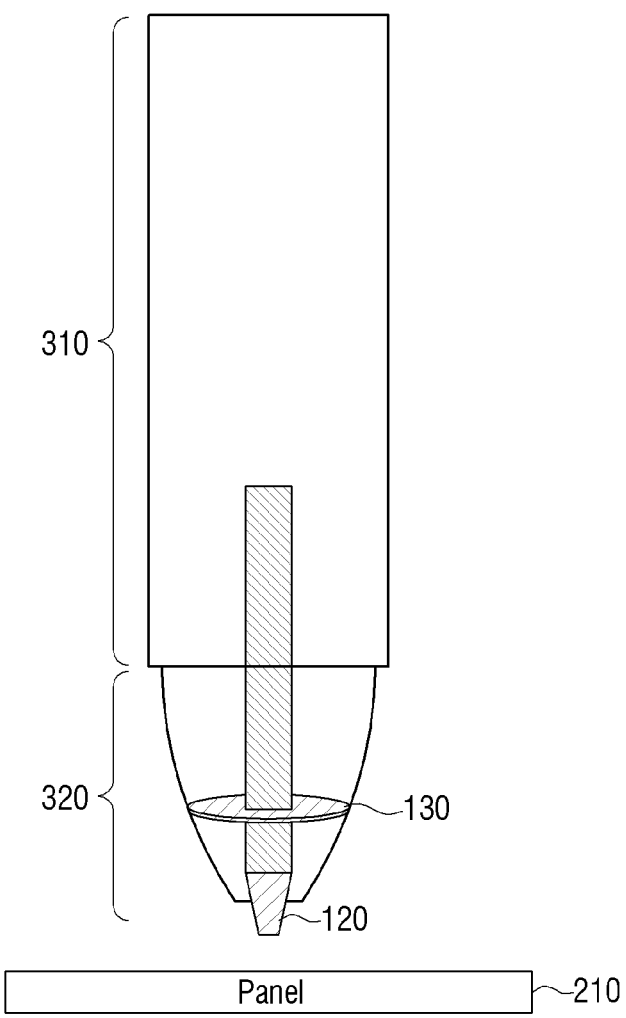
FIG. 3B is a diagram for illustrating a configuration of an input device according to an embodiment of the disclosure.

According to an embodiment of the disclosure, the input device 100 may include a straight-type body part 310 which a user can hold easily and an input part 320 coupled to one end thereof, as illustrated in FIG. 3A. For example, the input part 320 may be implemented in the form of a cone as illustrated in FIG. 3A, and on one end thereof, the pen tip 120 may be exposed. However, the body part 310 and the input part 320 are just distinguished for the convenience of explanation, and the input part 320 can obviously be implemented as a portion of the body part 310. That is, the input part 320 and the body part 310 may be implemented as one main body, without distinction.

The pen tip 120 may be formed as, for example, a conductive metal tip. The conductive pen tip 120 may exist inside a non-conductive material, or may be implemented as a form wherein a portion of the conductive pen tip 120 is exposed to the outside. Also, for making a feel of writing smooth during usage, an insulating material that prevents direct contact of the conductive pen tip 120 with the touch screen of the electronic device 200 may be further included. As an insulating material, there may be, for example, rubber, plastic, glass, etc.

According to an embodiment of the disclosure, the electronic device 200 may be implemented such that a separate communicator 110 is not included, and the pen tip 120 performs the corresponding function. For example, the conductive pen tip 120 may perform a role of a transmitting electrode. When the conductive pen tip 120 contacts or hovers on the touch panel of the electronic device 200, the conductive pen tip 120 may be coupled to the touch panel on the contact (or hovering) point and transmit a signal to the contact (or hovering) point of the touch panel.

The electrode part 130 is formed on the input part 320 which is spaced apart at a predetermined interval from the pen tip 120. The electrode part 130 may be implemented as various shapes within a range that it can operate as a capacitor with respect to the electronic device 200. According to an embodiment of the disclosure, the electrode part 130 may be formed in a shape of an electrode ring or an electrode plate. Also, for the electrode part 130, various electrode materials may be used, and as an example, the electrode part 130 may be implemented as indium tin oxide (ITO). The processor 140 applies a predetermined frequency signal to the electrode part 130, and outputs the signal of which frequency changed according to a capacitance formed between the electrode part 130 and the electronic device 200. Here, the capacitance is characterized in that it changes according to a tilt of the input device 100, and detailed explanation in this regard will be made later.

According to an embodiment of the disclosure, the processor 140 may be implemented to include an oscillator (not shown), and the oscillator may be implemented as a form of outputting a frequency signal which changed according to a capacitance. According to an embodiment of the disclosure, the processor 140 may be implemented as a digital signal processor (DSP), and a DSP refers to an integrated circuit which processes digital signals. In this case, the oscillator may be implemented as a component of the DSP.

Meanwhile, the oscillator may be implemented, for example, as an RC oscillator or an LC oscillator. However, hereinafter, explanation will be made based on the assumption that the oscillator is implemented as an RC oscillator, for the convenience of explanation.

The RC oscillator is a circuit that generates a sine wave by returning some of an output voltage to an input side by using resistance R and a capacitor C. Based on the fact that σ=RC in the case of a capacitor, if a capacitance increases, the frequency of the RC oscillator decreases.

Figure 4A:
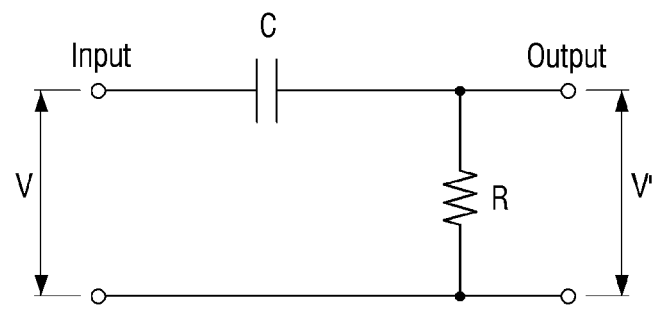
FIG. 4A is a diagram for illustrating an operation of an RC oscillator according to an embodiment of the disclosure.
Figure 4B:
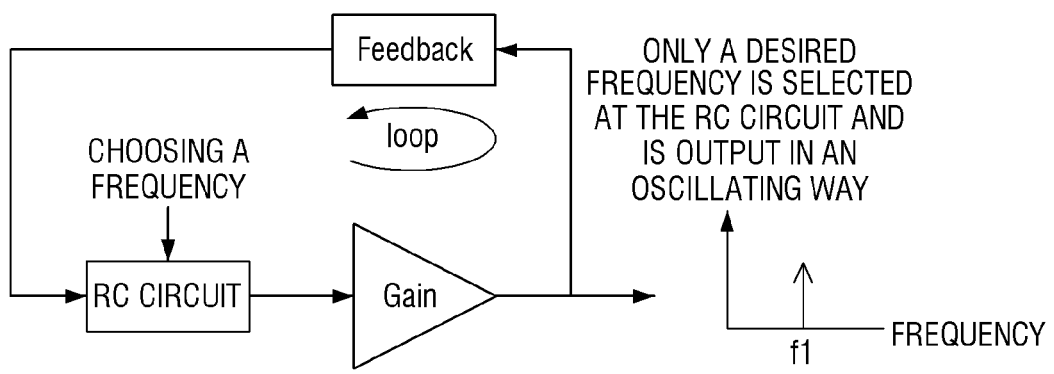
FIG. 4B is a diagram for illustrating an operation of an RC oscillator according to an embodiment of the disclosure.

FIGS. 4A and 4B are diagrams for illustrating an operation of an RC oscillator according to an embodiment of the disclosure.

FIG. 4A illustrates a configuration of an RC circuit used for an RC oscillator, and an output voltage V' applied to the resistance R has a changed frequency (or phase) compared to an input voltage V, and the changed frequency (or phase) becomes dependent on the resistance R and the capacitance C. Accordingly, in case the resistance R is regular, the changed frequency (or phase) varies according to the capacitance C.

As illustrated in FIG. 4B, if an RC circuit as in FIG. 4A is implemented in a feedback loop having a specific gain, only a specific frequency selected by the RC circuit oscillates (feedback theory).

Meanwhile, a capacitance formed between the electrode part 130 and the electronic device 200 may operate as a capacitance of the RC oscillator as illustrated in FIGS. 4A and 4B.

That is, the electrode part 130 operates as a first electrode of the capacitor, and the touch panel of the electronic device 200 operates as a second electrode of the capacitor, and by the capacitance C=ε(A/t) of the capacitor, the capacitance changes according to the areas of the first and second electrodes, the distance between the electrodes, and the dielectric constant of the material between the electrodes. That is, according to the tilting degree of the input device 100, at least one of the distance between the first and second electrodes, the effective areas (the areas wherein an actual capacitor function is performed) of the electrodes, or the dielectric constant of the material between the electrodes may change, and accordingly, the capacitance changes.

For example, in case the input device 100 is tilted, the dielectric constant of the touch panel 210 influences the capacitance of the capacitor of the input device 100. As an example, a capacitance formed in an opposite direction to the tilting direction is not influenced so much by the touch panel 210, but the capacitance of the capacitor in the tilting direction changes a lot by the influence of the touch panel 210, as illustrated in the drawings. However, as described above, not only the dielectric constant of the material between the electrodes constituting a capacitor, but also the distance between the electrodes and the effective areas of the electrodes may vary according to a tilt, and this can also influence the capacitance obviously.

Also, there is an effect that the capacitance between one side of the electrode part 130 and the touch panel of the electronic device 200 and the capacitance between the other side of the electrode part 130 and the touch panel of the electronic device 200 are connected in parallel. In this case, the entire capacitance of the plurality of capacitors connected in parallel may be determined as a sum of the capacitances, and according to the tilting degree of the input device 100, the sum of the capacitances changes.

As described above, if a capacitance formed between the electrode part 130 and the electronic device 200 operates as the capacitance of the RC oscillator, and the capacitance changes according to the tilting degree of the input device 100, the frequency output from the RC oscillator also changes. According to an embodiment of the disclosure, a signal output from the RC oscillator may be provided to the pen tip 120 and transmitted to the electronic device 200, and the electronic device 200 may acquire tilt information of the input device 100 based on frequency information.

The processor 140 may control the communicator 110 to transmit the output signal of the RC oscillator to the electronic device 200. Here, the output signal of the RC oscillator may be a signal of which frequency changed according to the tilting degree of the input device 100, as described above.

Meanwhile, according to the forms of implementation of the input device 100, the input device 100 may be implemented in the form of a DSP described above, or in the form of a field programmable gate array (FPGA). Alternatively, the processor 140 may include one or more of a central processing unit (CPU), a micro controller unit (MCU), a controller, an application processor (AP) or a communication processor (CP), and an ARM processor, or may be defined by the terms. In this case, the oscillator may be implemented as a separate component from the processor 140.

Meanwhile, according to another embodiment of the disclosure, the electrode part 130 may include a plurality of sub electrodes that are spaced apart from one another.

For example, as illustrated in FIG. 5A, the electrode part 130 may include a plurality of sub electrodes 131-1, 131-2, 131-3 that are spaced apart from one another. In this case, as illustrated in FIG. 5A, the plurality of sub electrodes may be arranged such that they are spaced apart at a predetermined interval from one another on the same line, and surround the input part 320 of the input device 100. Here, the arrangement wherein the sub electrodes are arranged to surround the input part 320 means an arrangement wherein the sub electrodes are arranged on the rim of the input part 320, but obviously does not mean an arrangement wherein the plurality of sub electrodes 131-1, 131-2, 131-3 are arranged to be exposed to the outside. That is, it would be obvious to those skilled in the art that the body part 310 and the input part 320 can be covered by a case.

Figure 5B:
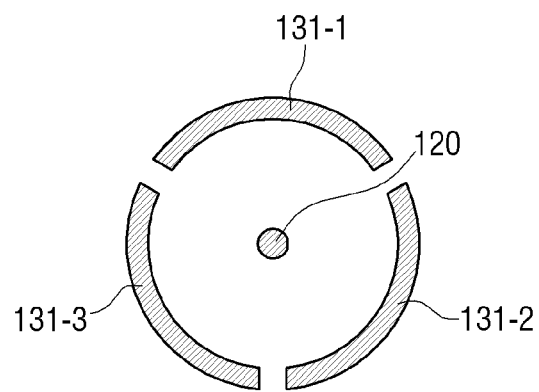
FIG. 5B is a diagram for illustrating a configuration of an input device according to another embodiment of the disclosure.

For example, the plurality of sub electrodes 131-1, 131-2, 131-3 may be arranged in a form as illustrated in FIG. 5B.

In case the electrode part 130 is implemented as a form of including a plurality of sub electrodes as described above, the input device 100 may provide not only tilt information but also rotation information (or information on the tilting direction) to the electronic device 200. Here, rotation information indicates how much the input device 100 rotated based on a predetermined position, i.e., in which direction the input device 100 is tilted. For example, implementation may be made such that thickness of handwriting trajectory, etc. varies according to in which position the current tilting direction of the input device 100 is, based on a specific reference position (e.g., a position wherein the mark is displayed, a position wherein a specific marker is provided, etc.) of the input device 100. For example, a case wherein implementation is made such that the thickness of handwriting trajectory is the thinnest when the input device 100 is tilted to a position wherein a specific marker is provided, and based on the position, the handwriting trajectory becomes thicker according to a rotating degree may correspond to the above case. That is, in case implementation is made such that the thickness of handwriting trajectory is the thinnest when the input device 100 is tilted to a position wherein a specific marker is provided, and the thickness of handwriting trajectory is the thickest when the input device 100 is tilted to an opposite direction, rotation information of the input device 100 becomes necessary.

In a case as above, a plurality of capacitances formed between the plurality of sub electrodes arranged in different positions from one another and the touch panel of the electronic device 200 may inform the degree of rotation of the input device 100 based on a predetermined position when it is tilted.

In this case, the processor 140 may apply different frequency signals to each of the plurality of sub electrodes 131-1, 131-2, 131-3.

For example, the processor 140 may apply a first frequency signal to the first sub electrode 131-1, apply a second frequency signal to the second sub electrode 131-2, and apply a third frequency signal to the third sub electrode 131-3. Here, the first to third frequency signals may be signals having different frequencies from one another.

In this case, the first frequency signal of which frequency changed according to a first capacitance formed between the first sub electrode 131-1 and the electronic device 200 may be output from the processor 140, the second frequency signal of which frequency changed according to a second capacitance formed between the second sub electrode 131-2 and the electronic device 200 may be output, and the third frequency signal of which frequency changed according to a third capacitance formed between the third sub electrode 131-3 and the electronic device 200 may be output. In this case, implementation may be made such that the ranges of frequency change of the first to third frequencies that change according to the tilt of the input device 100 do not overlap with one another.

According to an embodiment of the disclosure, the first to third frequency signals output from the processor 140 of which frequencies changed may be provided to the pen tip 120 and transmitted to the electronic device 200, and the electronic device 200 may acquire rotation information of the input device 100 based on frequency information of the first to third frequency signals.

Specifically, when the changed first to third frequency signals are received, the electronic device 200 may determine the tilt based on the changed frequencies, and figure out rotation information of the input device 100 based on the positions of the first to third sub electrodes 131-1 to 131-3 corresponding to each of the first to third frequency signals.

Meanwhile, in the aforementioned embodiment, it was described that the electrode part 130 includes three sub electrodes. However, this is merely an example, and the number of sub electrodes is not limited thereto.

Figure 6A:
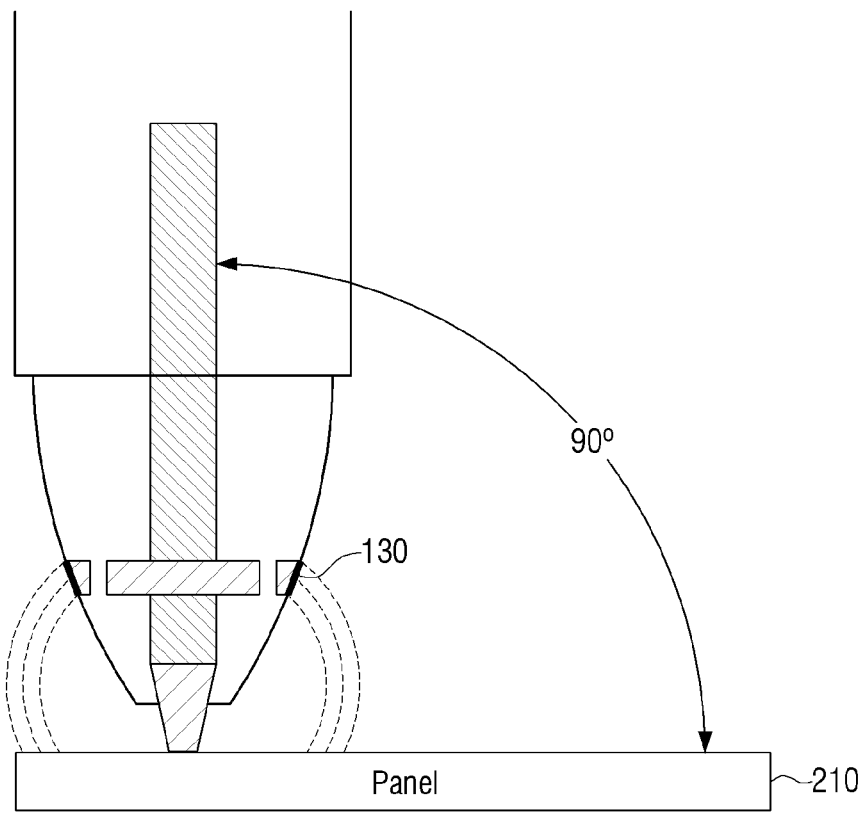
FIG. 6A is a diagram for illustrating a method of detecting a tilt according to an embodiment of the disclosure.
Figure 6B:
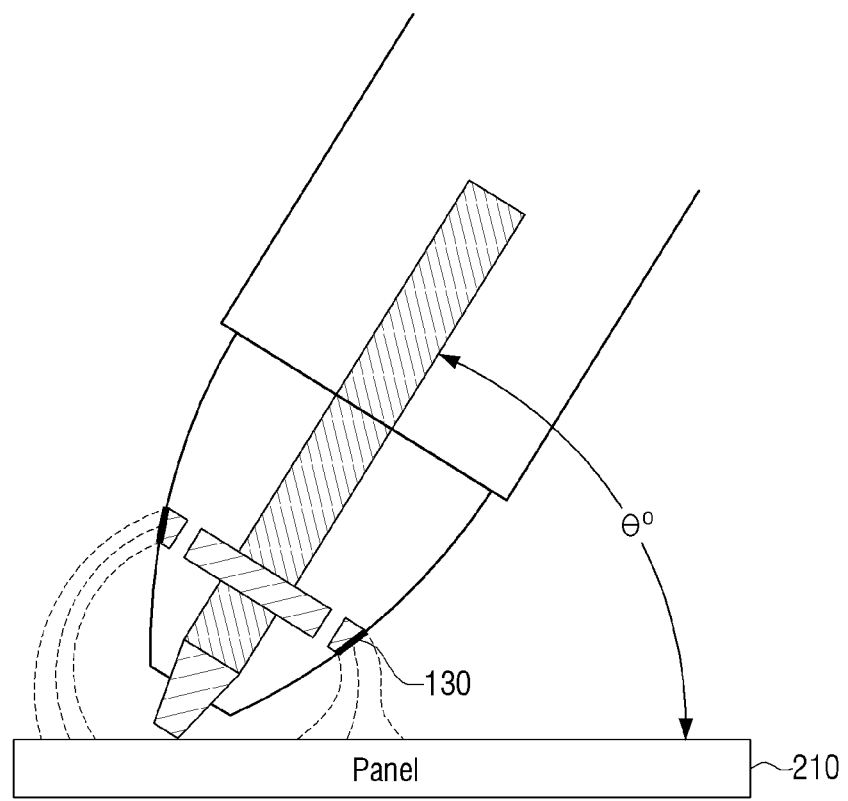
FIG. 6B is a diagram for illustrating a method of detecting a tilt according to an embodiment of the disclosure.

FIGS. 6A and 6B are diagrams for illustrating a method of detecting a tilt according to an embodiment of the disclosure.

As illustrated in FIG. 6A, in case the input device 100 stands vertically, i.e., in case the tilt with respect to the touch panel 210 is 90 degrees, the processor 140 may be set to output a predetermined frequency signal.

Meanwhile, as illustrated in FIG. 6B, in case the input device 100 is tilted, a capacitance between the electrode part 130 and the touch panel 210 changes, and accordingly, the frequency signal output from the processor 140, i.e., the RC oscillator changes.

Figure 7A:
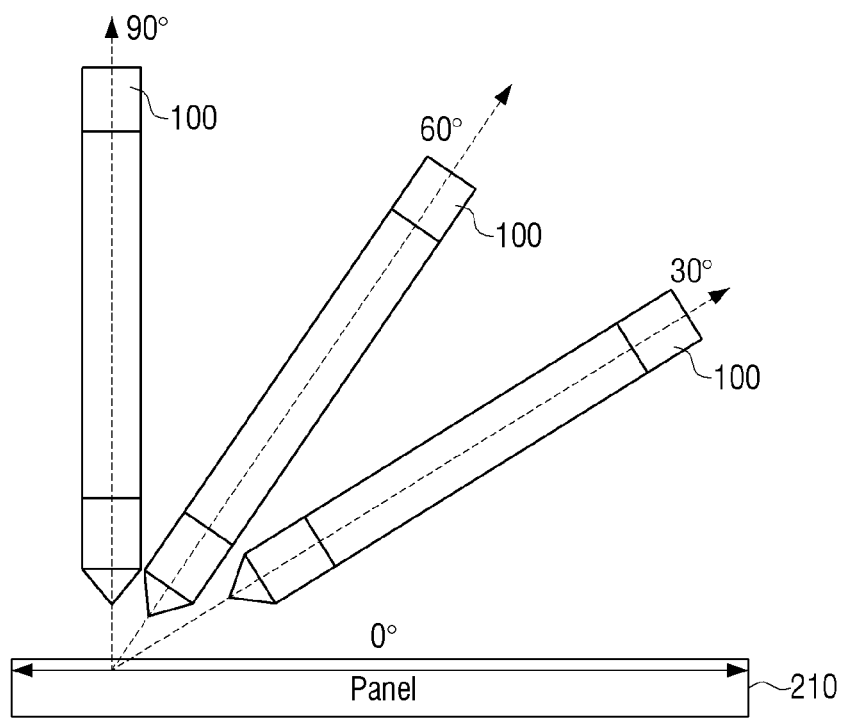
FIG. 7A is a diagram for illustrating a method of detecting a tilt according to an embodiment of the disclosure.
Figure 7B:
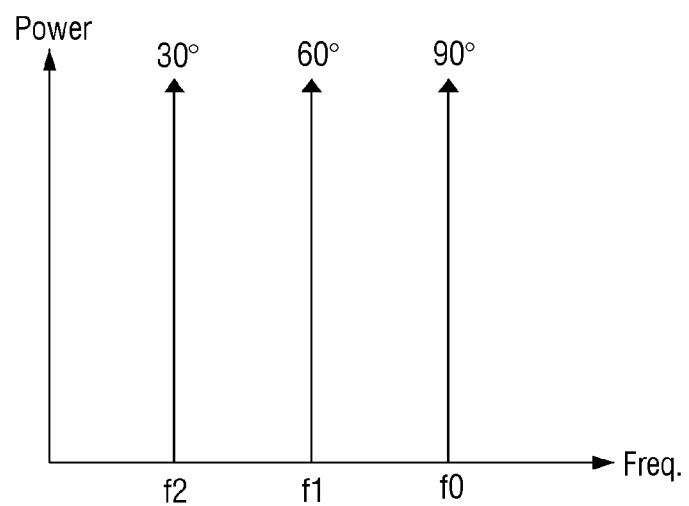
FIG. 7B is a diagram for illustrating a method of detecting a tilt according to an embodiment of the disclosure.

For example, as illustrated in FIGS. 7A and 7B, in case it is set such that a frequency signal of f0 is output if the tilt of the input device 100 is 90 degrees, a frequency signal of f1 may be output if the tilt of the input device 100 is 60 degrees, and a frequency signal of f2 may be output if the tilt of the input device 100 is 30 degrees.

In this case, the electronic device 200 may acquire tilt information based on frequency information of the signal received from the input device 100.

According to an embodiment of the disclosure, the electronic device 200 may store tilt information corresponding to the frequency of the received signal in the form of a lookup table. In this case, the lookup table may be acquired based on a form in which values acquired by experiments at the time of manufacture of the electronic device 200 were stored in advance or data accumulated while the input device 100 and the electronic device 200 were used.

According to another embodiment of the disclosure, the electronic device 200 may store an algorithm (e.g., a formula, etc.) that can generate tilt information based on frequency information of a frequency signal. As an example, the electronic device 200 may store an algorithm that can store a reference frequency corresponding to a reference tilt (e.g., 90 degrees, 0 degree), and acquire a tilt corresponding to the frequency of the received signal based on the reference tilt and the reference frequency. As another example, the electronic device 200 may store an algorithm that can acquire the tilt of the input device 100 based on the difference between the initial frequency (or the input frequency) of the oscillator and the frequency of the received signal.

Figure 8:
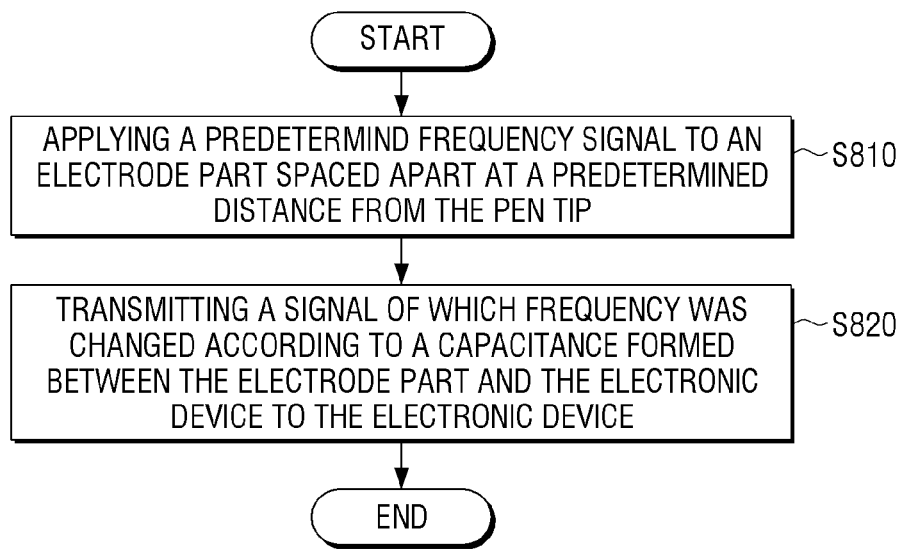
FIG. 8 is a flow chart for illustrating a control method of an input device according to an embodiment of the disclosure.

FIG. 8 is a flow chart for illustrating a control method of an input device according to an embodiment of the disclosure.

According to the control method of the input device 100 according to an embodiment of the disclosure illustrated in FIG. 8, first, a predetermined frequency signal is applied to an electrode part spaced apart at a predetermined interval from a pen tip formed on one end portion of the input device 100 at operation S810.

Then, the signal of which frequency changed according to a capacitance formed between the electrode part and the electronic device 200 is transmitted to the electronic device at operation S820.

Here, the input device 100 includes an oscillator, and the capacitance formed between the electrode part and the electronic device 200 may operate as the capacitance of the oscillator.

Also, the electrode part may include a first sub electrode and a second sub electrode that are spaced apart from each other. In this case, the oscillator may apply a first frequency signal to the first sub electrode and apply a second frequency signal to the second sub electrode, and output the first frequency signal of which frequency changed according to a first capacitance formed between the first sub electrode and the electronic device 200, and output the second frequency signal of which frequency changed according to a second capacitance formed between the second sub electrode and the electronic device 200. In this case, in the operation S820 of transmitting to the electronic device 200, the first and second frequency signals of which frequencies changed may be transmitted to the electronic device 200.

According to the various embodiments of the disclosure as described above, a frequency signal is transmitted while tilt information of an input device is included therein. Accordingly, the amount of power consumption of the input device can be reduced. Also, by a method of reflecting a capacitance in output of an oscillator and detecting the capacitance, the configuration of the input device can be made simple, and the area of chip design can be minimum.

In the aforementioned embodiments, explanation was made based on the assumption that the input device 100 is implemented as an active type, but the disclosure may be applied to a case wherein the input device 100 is implemented as a passive type. However, as a separate oscillator needs to be provided for transmitting tilt information according to an embodiment of the disclosure, it will obviously be more advantageous if the disclosure is applied to the input device 100 of an active type.

Meanwhile, methods according to the aforementioned various embodiments of the disclosure may be implemented in the form of software, programs, or applications that can be installed on conventional input devices.

Also, methods according to the aforementioned various embodiments of the disclosure may be implemented only by software upgrade, or hardware upgrade for conventional input devices.

In addition, a non-transitory computer readable medium storing a program performing the control method according to the disclosure sequentially may be provided.

A non-transitory computer-readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disk, a blue-ray disk, a USB, a memory card, a ROM and the like.

Further, while preferred embodiments of the disclosure have been shown and described so far, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An input device comprising:
   a communicator for communicating with an electronic device;
   a pen tip provided on one end portion of the input device;
   an electrode part provided at a position spaced apart at a predetermined interval from the pen tip, the electrode part comprising a first sub electrode and a second sub electrode that are spaced apart from each other; and
   a processor configured to apply a first frequency signal to the first sub electrode and apply a second frequency signal to the second sub electrode, and control the communicator so as to transmit, to the electronic device, the first frequency signal of which frequency is changed according to a first capacitance formed between the first sub electrode and the electronic device and the second frequency signal of which frequency is changed according to a second capacitance formed between the second sub electrode and the electronic device, wherein capacitance changes according to the tilting degree of the input device.

2. The input device of claim 1, wherein the processor includes an RC oscillator.

3. The input device of claim 1, wherein the first frequency signal and the second frequency signal are signals that change within different frequency ranges from each other according to a degree that the input device is rotated based on a predetermined position.

4. The input device of claim 1, wherein the input device is implemented as a stylus pen of an active type.

5. An electronic system comprising an input device and an electronic device communicating with the input device, which comprises:
   an input device that includes a pen tip provided on one end portion of the input device, an electrode part provided at a position spaced apart at a predetermined interval from the pen tip, the electrode part comprising a first sub electrode and a second sub electrode that are spaced apart from each other, and an oscillator configured to apply a first frequency signal to the first sub electrode and apply a second frequency signal to the second sub electrode, and output the first frequency signal of which frequency is changed according to a first capacitance formed between the first sub electrode and the electronic device and the second frequency signal of which frequency is changed according to a second capacitance formed between the second sub electrode and the electronic device, and a communicator configured to transmit the first frequency signal and the second frequency signal output from the oscillator to the electronic device; and
   an electronic device that determines a tilt of the input device based on the first frequency signal and the second frequency signal received from the input device, and performs an operation corresponding to the determined tilt.

6. The electronic system of claim 5, wherein the oscillator is implemented as an RC oscillator.

7. The electronic system of claim 5, wherein the electronic device determines a tilt of the input device by comparing a reference frequency and a frequency of an output signal received from the input device.

8. The electronic system of claim 7, wherein the reference frequency is the frequency of an output signal of the oscillator in a state wherein the input device is at a predetermined angle with respect to the electronic device.

9. The electronic system of claim 5, wherein the electronic device is configured to: based on receiving the first and second frequency signals from the input device, determine a degree that the input device is rotated based on a predetermined position based on the frequencies of the first and second frequency signals.

10. A control method of an input device comprising a pen tip provided on one end portion of the input device and an electrode part provided at a position spaced apart at a predetermined interval from the pen tip, the electrode part comprising a first sub electrode and a second sub electrode that are spaced apart from each other, the control method comprising:
    applying a first frequency signal to the first sub electrode and applying a second frequency signal to the second sub electrode; and
    transmitting, to the electronic device, the first frequency signal of which frequency is changed according to a first capacitance formed between the first sub electrode and the electronic device and the second frequency signal of which frequency is changed according to a second capacitance formed between the second sub electrode and the electronic device,
    wherein capacitance changes according to the tilting degree of the input device.

11. The control method of claim 10, wherein the input device includes an RC oscillator.

12. The control method of claim 10, wherein the first frequency signal and the second frequency signal are signals that change within different frequency ranges from each other according to a degree that the input device is rotated based on a predetermined position.

* * * * *